(12) United States Patent
Takenaka

(10) Patent No.: US 11,281,087 B2
(45) Date of Patent: Mar. 22, 2022

(54) IMAGING DEVICE, IMAGE PROCESSING APPARATUS, AND IMAGE PROCESSING METHOD

(71) Applicant: RICOH COMPANY, LTD., Tokyo (JP)

(72) Inventor: Hirokazu Takenaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/976,295

(22) PCT Filed: Mar. 6, 2019

(86) PCT No.: PCT/JP2019/008892
§ 371 (c)(1),
(2) Date: Aug. 27, 2020

(87) PCT Pub. No.: WO2019/176690
PCT Pub. Date: Sep. 19, 2019

(65) Prior Publication Data
US 2021/0041780 A1    Feb. 11, 2021

(30) Foreign Application Priority Data

Mar. 16, 2018  (JP) .............................. JP2018-050207

(51) Int. Cl.
*G03B 37/04* (2021.01)
*H04N 5/232* (2006.01)
*H04N 5/247* (2006.01)

(52) U.S. Cl.
CPC ......... *G03B 37/04* (2013.01); *H04N 5/23238* (2013.01); *H04N 5/247* (2013.01)

(58) Field of Classification Search
CPC .... G03B 37/04; H04N 5/23238; H04N 5/247; H04N 2013/0081; G01B 11/245; G01C 15/00; G01C 11/02; G06T 7/55
See application file for complete search history.

(56) References Cited

U.S. PATENT DOCUMENTS 9,491,339 B1    11/2016  Geerds
9,826,152 B1 *  11/2017  Martin ................... G02B 13/06
(Continued)

FOREIGN PATENT DOCUMENTS

| EP | 2 998 778 A2 | 3/2016 |
| JP | 2001-285692 | 10/2001 |
| JP | 2008-096162 | 4/2008 |
| JP | 2012-504776 A | 2/2012 |

(Continued)

OTHER PUBLICATIONS

International Search Report and Written Opinion dated Sep. 18. 2019 in PCT/JP2019/008892 filed on Mar. 6, 2019.
Invitation to pay additional fees and, where applicable, protest fee issued on Jun. 25, 2019 in PCT/JP2019/008892 filed on Mar. 6, 2019.

(Continued)

*Primary Examiner* — Tat C Chio
(74) *Attorney, Agent, or Firm* — Xsensus LLP

(57) ABSTRACT

An imaging device (1a, 1b, 1c, 1d, 1e, 1f) includes at least one imager (Cam0, Cam1, Cam2, Cam3, Cam4, Cam5, Cam6, Cam7) including an imaging element ($21_0$, $21_2$) configured to receive light incident through a lens ($24_0$); and a casing (10a, 10b, 10c 10d 10e, 10f) at which at least four of the imagers are arranged, the casing being configured such that each one of the imagers and another one of the imagers have optical axes substantially parallel to each other and have opposite incident directions of light on the optical axes, and each one of the imagers is arranged outside imagable ranges of the other imagers.

10 Claims, 27 Drawing Sheets

(56) References Cited

U.S. PATENT DOCUMENTS

| | | |
|---|---|---|
| 2014/0071226 A1 | 3/2014 | Satoh et al. |
| 2014/0079333 A1* | 3/2014 | Hirai ................... G06T 5/007 |
| | | 382/255 |
| 2014/0267596 A1 | 9/2014 | Geerds |
| 2015/0222816 A1 | 8/2015 | Shohara et al. |
| 2016/0061954 A1 | 3/2016 | Walsh et al. |
| 2016/0147045 A1 | 5/2016 | Masuda et al. |
| 2016/0300323 A1* | 10/2016 | Nakagawa ............ G06T 3/0062 |
| 2017/0045814 A1 | 2/2017 | Geerds |
| 2017/0302828 A1 | 10/2017 | Geerds |
| 2017/0363949 A1 | 12/2017 | Valente et al. |
| 2018/0084257 A1* | 3/2018 | Abbas ................. H04N 19/147 |
| 2018/0136336 A1 | 5/2018 | Walsh et al. |
| 2018/0278916 A1* | 9/2018 | Kim ....................... H04N 5/247 |

FOREIGN PATENT DOCUMENTS

| | | |
|---|---|---|
| JP | 2012-165102 | 8/2012 |
| JP | 2012-220521 A | 11/2012 |
| JP | 2014-057156 A | 3/2014 |
| KR | 10-0944389 B1 | 3/2010 |
| KR | 2017-0017700 A | 2/2017 |
| WO | 2010/121506 A1 | 10/2010 |
| WO | 2013/186803 A1 | 12/2013 |

OTHER PUBLICATIONS

Office Action dated Dec. 7, 2021 in Japanese Patent Application No. 2018-050207, 2 pages.

* cited by examiner

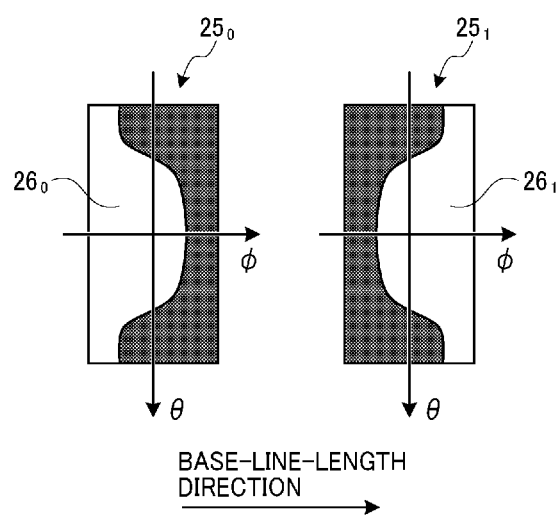

IMAGING DEVICE, IMAGE PROCESSING APPARATUS, AND IMAGE PROCESSING METHOD

TECHNICAL FIELD

The present invention relates to an imaging device, an image processing apparatus, and an image processing method.

BACKGROUND ART

There is a distance measuring technology (stereo ranging technology) using a stereo image, as a technology for measuring a three-dimensional object or scene. With the stereo ranging technology, cameras are arranged at a plurality of different viewpoints and images are captured such that imaging ranges overlap one another, and corresponding points are detected from among the captured images. Distances from the cameras to the corresponding points are measured on the basis of the parallax of the corresponding points.

When the stereo ranging technology is used in a system using a plurality of cameras with a normal angle of view, the imaging ranges of the cameras represent a distance measurable range as a matter of course. To enable measurement in a wider range, for example, JP-3827912-B describes a technology in which 12 stereo camera units are attached to respective surfaces of a dodecahedron and that can acquire color images and distance information in all directions in real time. In addition, there is also known a configuration, like JP-5483027-B or JP-5011528-B, that uses a plurality of spherical-image cameras including two fish-eye lenses arranged such that incident surfaces of the fish-eye lenses are opposite to each other to enable distance measurement in all directions using a fewer number of cameras.

CITATION LIST

Patent Literature

PTL 1: JP-3827912-B
PTL 2: JP-5483027-B
PTL 3: JP-5011528-B

SUMMARY OF INVENTION

Technical Problem

However, in the stereo camera system using the spherical-image cameras of related art, three or more spherical-image cameras are required for distance measurement in all directions. That is, in a stereo camera system using two spherical-image cameras, a captured image of each spherical-image camera includes the other spherical-image camera, and it is difficult to measure the distance in that direction. To address the difficulty in distance measurement, the related art has a problem in which at least three spherical-image cameras have to be used.

The present invention is made in light of the situations and an object of the invention is to execute distance measurement in all directions with a smaller configuration.

Solution to Problem

An imaging device according to an aspect of the invention includes at least one imager including an imaging element configured to receive light incident through a lens; and a casing at which at least four of the imagers are arranged, the casing being configured such that each one of the imagers and another one of the imagers have optical axes substantially parallel to each other and have opposite incident directions of light on the optical axes, and each one of the imagers is arranged outside imagable ranges of the other imagers.

An image processing apparatus according to another aspect of the invention includes an acquirer configured to acquire a captured image captured by each one of at least four imagers each including an imaging element configured to receive light incident through a lens, the imagers being arranged at a casing such that each one of the imagers and another one of the imagers have optical axes substantially parallel to each other and have opposite incident directions of light on the optical axes, and each one of the imagers is arranged outside imagable ranges of the other imagers; and an image processor configured to generate a spherical distance image expressed by three-dimensional point-group information based on the captured images acquired from all the imagers arranged at the casing.

An image processing method according to still another aspect of the invention includes acquiring a captured image captured by each one of at least four imagers each including a lens with a total angle of view of 180° or more and an imaging element configured to receive light incident through the lens, the imagers being arranged at a casing such that each one of the imagers and another one of the imagers have optical axes substantially parallel to each other and have opposite incident directions of light on the optical axes, and each one of the imagers is arranged outside imagable ranges of the other imagers; and generating a spherical distance image expressed by three-dimensional point-group information based on the captured images acquired from all the imagers arranged at the casing.

Advantageous Effects of Invention

With the aspects of the present invention, an advantageous effect that the distance measurement in all directions can be executed with the smaller configuration is attained.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 11C is an illustration for explaining the ranging area and the ranging image according to the embodiment.

DESCRIPTION OF EMBODIMENTS

Figure 1A:
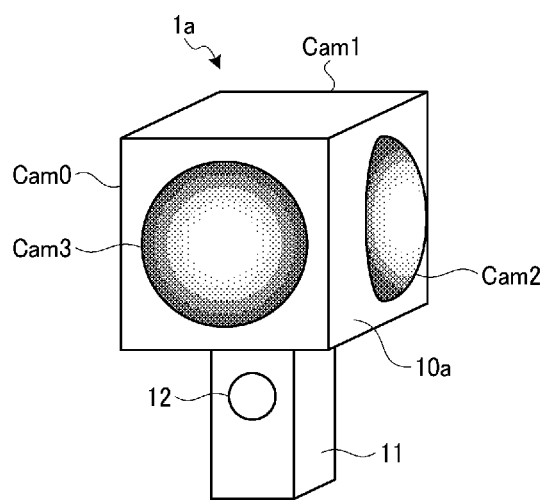
FIG. 1A is an illustration for explaining an overview of an imaging device according to an embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of an imaging device, an image processing apparatus, and an image processing method are described below in detail with reference to the attached drawings.

Overview of Imaging Device According to Embodiment

Figure 1B:
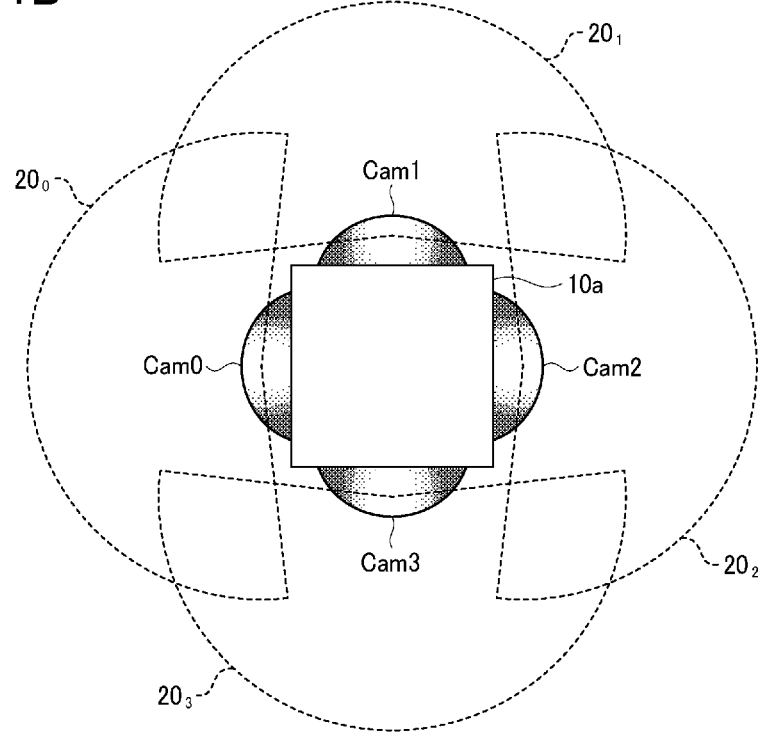
FIG. 1B is an illustration for explaining the overview of the imaging device according to the embodiment.

FIGS. 1A and 1B are illustrations for explaining an overview of an imaging device according to an embodiment. FIG. 1A is a perspective view briefly illustrating an example appearance of an imaging device 1a according to an embodiment. In FIG. 1A, the imaging device 1a according to the embodiment includes a cubic casing 10a, and a grip 11 for holding the imaging device 1a with a hand or the like. Imagers Cam0, Cam1, Cam2, and Cam3 each having an imagable range with a total angle of view of 180° or more are arranged on four surfaces (in this case, side surfaces) from among six surfaces of the casing 10a except two opposite surfaces (in this case, an upper surface and a bottom surface). The imagers Cam0 and Cam1 are arranged on the rear surface side of the casing 10a in FIG. 1A, and hence FIG. 1A illustrates just the reference signs.

The imagers Cam0, Cam1, Cam2, and Cam3 each include an optical system using a fish-eye lens, an imaging element constituted by, for example, a charge coupled device (CCD), and a drive circuit for driving the imaging element. The grip 11 is provided with an imaging button 12 for instructing image capturing. The grip 11 may be further provided with an operation unit with which operation such as settings on the imaging device 1a is made, and a display unit that displays the status and so forth.

FIG. 1B illustrates an example when the imaging device 1a is viewed from an upper surface side (a side opposite to a side provided with the grip 11) of the casing 10a. FIG. 1B illustrates examples of imagable ranges of the imagers Cam0, Cam1, Cam2, and Cam3 as imaging ranges $20_0$, $20_1$, $20_2$, and $20_3$. With the imaging device 1a according to the embodiment, the imagers Cam0, Cam1, Cam2, and Cam3 each are arranged so as not to be included in the imagable ranges of the other imagers.

The imagers Cam0, Cam1, Cam2, and Cam3 each can capture an image in a range including a hemisphere directed to a first direction along the optical axis of the imager, and a set of the imager directed to the first direction along the optical axis and another imager corresponding to a hemisphere directed to a second direction opposite to the first direction can capture an image in a spherical range. In the example in FIG. 1B, a set of the imagers Cam0 and Cam2, and a set of the imagers Cam1 and Cam3 each can capture an image in a spherical range.

That is, in the imaging device 1a according to the embodiment, the imagers Cam0, Cam1, Cam2, and Cam3 are arranged such that each one of the imagers Cam0, Cam1, Cam2, and Cam3 does not image capture the other imagers within a total angle of view of 180° of a captured image of the one imager. In addition, the imagers Cam0, Cam1, Cam2, and Cam3 are arranged such that each one of the imagers Cam0, Cam1, Cam2, and Cam3 and another one of the other imagers have optical axes substantially parallel to each other and have opposite incident directions of light on the optical axes.

In other words, the casing 10a is configured such that each one of the imagers Cam0, Cam1, Cam2, and Cam3 and another one of the other imagers of the imagers Cam0, Cam1, Cam2, and Cam3 have optical axes substantially parallel to each other and have opposite incident directions of light on the optical axes; and each one of the imagers Cam0, Cam1, Cam2, and Cam3 is arranged outside the imagable ranges of the other imagers of the imagers Cam0, Cam1, Cam2, and Cam3.

For the imaging device 1a according to the embodiment, since the imagers Cam0, Cam1, Cam2, and Cam3 are arranged as described above, a desirable direction is included in the imagable ranges of at least two imagers, and hence omnidirectional stereo ranging can be executed without a blind spot. Thus, the distance measurement in all directions can be executed with a smaller configuration.

Figure 2:
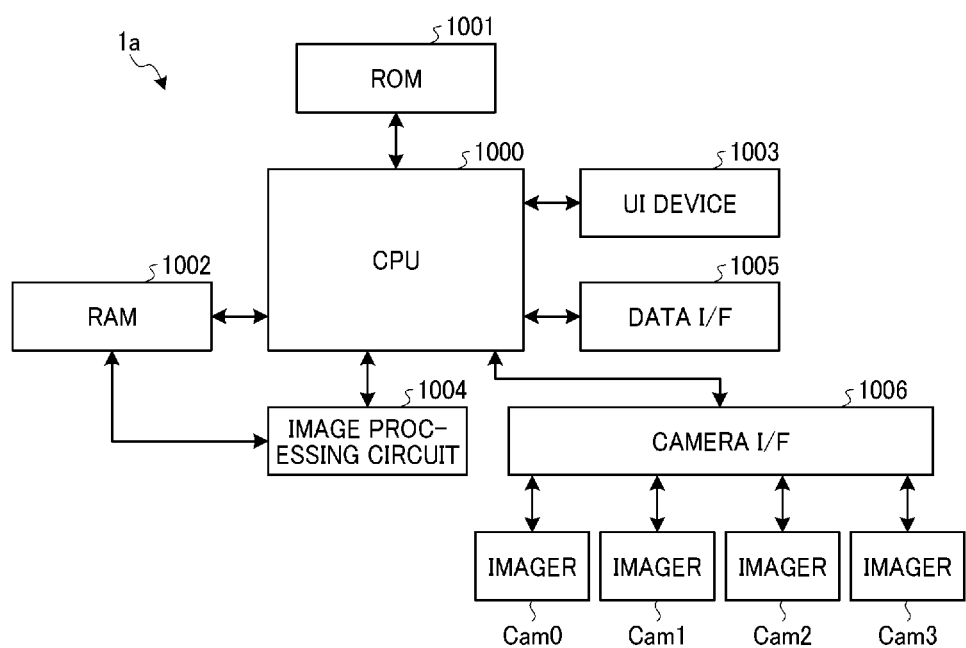
FIG. 2 is a block diagram illustrating an example of a hardware configuration of the imaging device according to the embodiment.

FIG. 2 is a block diagram illustrating an example of a hardware configuration of the imaging device 1a according to the embodiment. In FIG. 2, the imaging device 1a includes a central processing unit (CPU) 1000, a read only memory (ROM) 1001, a random access memory (RAM) 1002, a user interface (UI) device 1003, an image processing circuit 1004, a data interface (I/F) 1005, and a camera interface (I/F) 1006.

The CPU 1000 controls the entire operation of the imaging device 1a by using the RAM 1002 as a work memory in accordance with a program previously stored in the ROM 1001. The UI device 1003 includes, for example, an input device for making various settings on the imaging button 12 and the imaging device 1a, and a display device that displays the status and so forth of the imaging device 1a. The image processing circuit 1004 is, for example, a digital signal processor (DSP), and executes image processing by using the RAM 1002 as a work memory in accordance with an instruction of the CPU 1000. The data I/F 1005 transmits and receives data between an external device and the imaging device 1a, and, for example, a universal serial bus (USB) can be applied to the data I/F 1005.

The camera I/F 1006 is an interface with respect to the imagers Cam0, Cam1, Cam2, and Cam3. The CPU 1000 generates, for example, a trigger signal in response to the operation made on the imaging button 12. The trigger signal is supplied to the imagers Cam0, Cam1, Cam2, and Cam3 via the camera I/F 1006. The imagers Cam0, Cam1, Cam2, and Cam3 each capture an image in response to the trigger signal and output the captured image. The captured image output from each one of the imagers Cam0, Cam1, Cam2, and Cam3 is a fish-eye image captured by a fish-eye lens.

The fish-eye image output from each one of the imagers Cam0, Cam1, Cam2, and Cam3 is transmitted to, for example, the CPU 1000 via the camera I/F 1006, and is stored in the RAM 1002. The image processing circuit 1004 performs image processing (described later) on each fish-eye image stored in the RAM 1002 in accordance with an instruction of the CPU 1000, generates a spherical image, and generates a spherical distance image that serves as three-dimensional point-group information.

Figure 3:
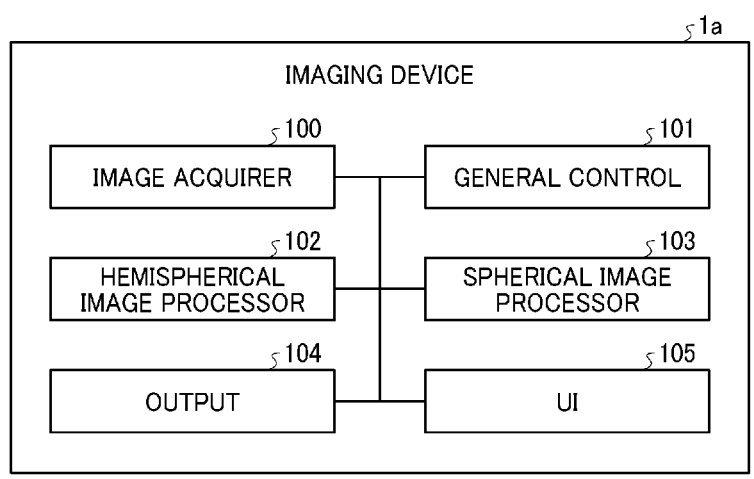
FIG. 3 is a functional block diagram of an example for explaining functions of the imaging device according to the embodiment.

FIG. 3 is a functional block diagram of an example for explaining functions of the imaging device 1a according to the embodiment. In FIG. 3, the imaging device 1a includes an image acquirer 100, a general control 101, a hemispherical image processor 102, a spherical image processor 103, an output 104, and a user interface (UI) 105.

The hemispherical image processor 102 and the spherical image processor 103 from among the image acquirer 100, the general control 101, the hemispherical image processor 102, the spherical image processor 103, and the output 104 have functions included in the above-described image processing circuit 1004. In addition, the image acquirer 100, the general control 101, and the output 104 are provided by programs that are operated in the CPU 1000. Without being limited to this, the hemispherical image processor 102 and the spherical image processor 103 may be also provided by programs that are operated in the CPU 1000. Part or the entirety of the image acquirer 100, the general control 101, and the output 104 may be constituted by a cooperative hardware circuit. The hemispherical image processor 102 and the spherical image processor 103 may be constituted by different hardware circuits.

The image acquirer 100 acquires the fish-eye images output from the imagers Cam0 to Cam3. The image acquirer 100 stores the acquired fish-eye images in, for example, the RAM 1002. The general control 101 controls the whole of the image acquirer 100, the hemispherical image processor 102, the spherical image processor 103, and the output 104. The hemispherical image processor 102 performs processing relating to the fish-eye images acquired from the imagers Cam0 to Cam3, and generates hemispherical images and hemispherical distance images. The spherical image processor 103 generates spherical images and spherical distance images based on the hemispherical images and the hemispherical distance images generated by the hemispherical image processor 102. Thus, the imaging device 1a according to the embodiment includes a function of an image processing apparatus (for example, functions of the hemispherical image processor 102 and the spherical image processor 103).

The output 104 performs output processing for outputting the spherical images and the spherical distance images generated by the spherical image processor 103 to the outside. The UI 105 controls processing for user's operation on the input device (including the imaging button 12) included in the UI device 1003, and displaying on the display device.

An image processing program for providing the function as the image processing apparatus in the imaging device 1a is provided by a file recorded in a recording medium that is readable by a computer, in an installable file format or an executable file format. The recording medium may be a compact disk (CD), a flexible disk (FD), a digital versatile disk (DVD), or the like. Without being limited to this, the image processing program may be provided by being stored in a computer that is connected to a network such as the Internet, and may be downloaded through the network. Alter-natively or additionally, the image processing program may be provided or distributed through a network such as the Internet.

The image processing program has a module configuration including the image acquirer 100, the general control 101, and the output 104 (in a case where the hemispherical image processor 102 and the spherical image processor 103 are provided by programs that are operated by the CPU 1000, these processors are also included). Regarding actual hardware, the CPU 1000 reads the image processing program from the recording medium such as the ROM 1001 and executes the image processing program, hence the above-described components are loaded in a main memory such as the RAM 1002, and the image acquirer 100, the general control 101, and the output 104 are generated in the main memory.

In the above description, while the configuration illustrated in FIG. 3 is included in the imaging device 1a, it is not limited thereto. For example, the configuration illustrated in FIG. 3 may be included in an external information processing device that can be connected to the imaging device 1a via the data I/F 1005.

Figure 4:
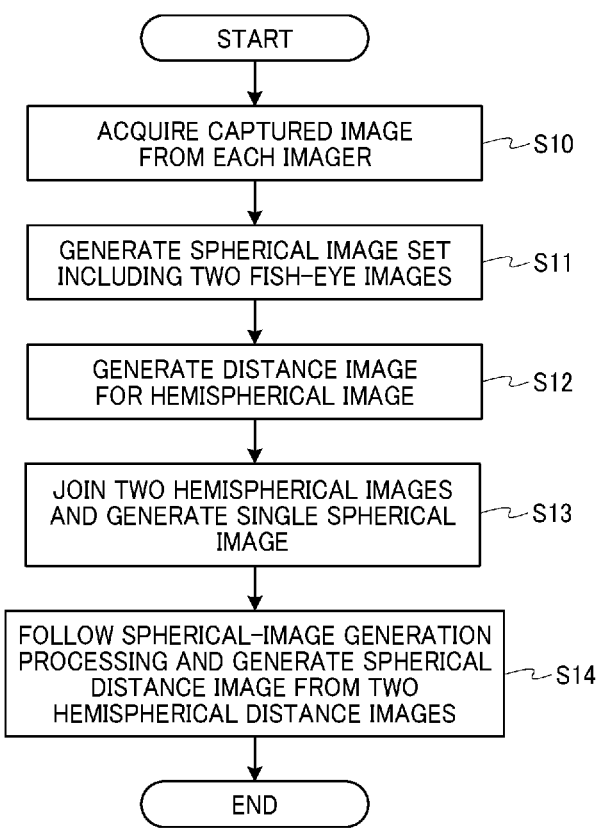
FIG. 4 is a flowchart of an example illustrating the entire processing in the imaging device according to the embodiment.

FIG. 4 is a flowchart of an example illustrating the entire processing in the imaging device 1a according to the embodiment. In the imaging device 1a according to the embodiment, the imaging button 12 is operated, hemispherical captured images of the imagers Cam0 to Cam3 are acquired via the camera I/F 1006 and input to the image processing circuit 1004, and spherical images and spherical distance images corresponding to the spherical images are output by the image processing circuit 1004.

In FIG. 4, in step S10, the image acquirer 100 acquires captured images as fish-eye images captured by the imagers Cam0 to Cam3. In this case, the imagers Cam0 to Cam3 output fish-eye images as color images. Without being limited to this, when just a spherical distance image is required in the end or when a spherical distance image and a monochrome spherical image are required in the end, the imagers Cam0 to Cam3 may output monochrome fish-eye images.

In the next step S11, the hemispherical image processor 102 generates a spherical image set including two fish-eye images. In this case, the hemispherical image processor 102 designates two fish-eye images captured by a set of two imagers having optical axes substantially parallel to each other and having opposite imaging directions (for example, a set of the imagers Cam0 and Cam2) from among the fish-eye images of the imagers Cam0 to Cam3 acquired in step S10, transforms the fish-eye images acquired from the set of the imagers, and generates hemispherical images. The hemispherical images are images in which each pixel has brightness information. When each pixel further has color information, the hemispherical images are color images.

A hemispherical image can be generated by transforming a fish-eye image into a form of an equidistant cylindrical projection. The equidistant cylindrical projection is projection that expresses three-dimensional directions using two variables such as the latitude and longitude of a globe, and provides displaying in a plane such that the latitude and longitude are orthogonal to each other. In this case, two hemispherical images are generated from the two fish-eye images included in the spherical image set generated in step S11.

In the next step S12, the hemispherical image processor 102 generates a distance image for each hemispherical image (referred to as hemispherical distance image). A distance image is an image in which a numerical value of each pixel indicates a distance. A method of generating a distance image will be described later. In this case, two hemispherical distance images are generated from the two fish-eye images included in the spherical image set generated in step S11.

In the next step S13, the spherical image processor 103 joins the two hemispherical images generated in step S12, and generates a single spherical image. In this case, a known technology can be used for joining a plurality of images, and the method is not particularly limited.

In the next step S14, the spherical image processor 103 follows the above-described processing in step S13, joins the two hemispherical distance images generated in step S12, and generates a single spherical distance image. In this case, a spherical distance image is generated through processing like step S13 to align the pixel positions of the spherical distance image with the pixel positions of the spherical image.

Details of Processing According to Embodiment

Figure 5A:
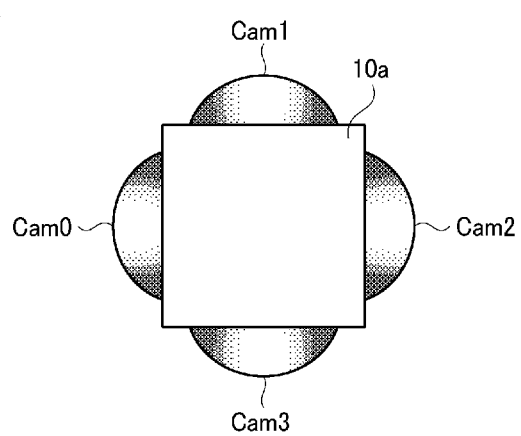
FIGS. 5A, 5B, and 5C (FIG. 5) are illustrations for explaining processing of generating a spherical image set according to the embodiment.
Figure 5B:
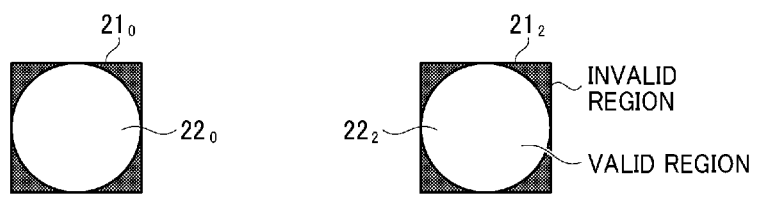
Figure 5C:
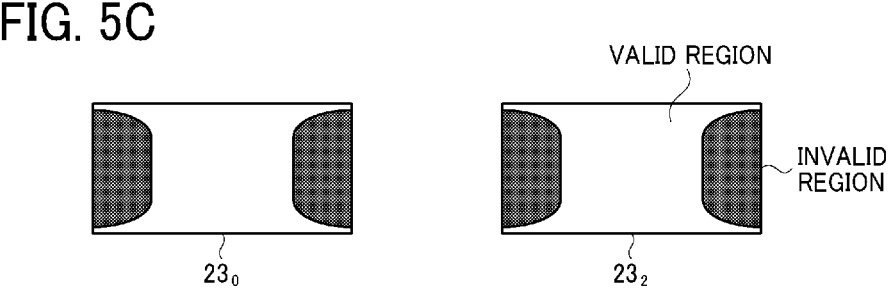

The processing in step S11 in the above-described flowchart of FIG. 4 will be described in more detail. FIG. 5 is an illustration for explaining processing of generating a spherical image set according to the embodiment.

In step S11 in the flowchart of FIG. 4, two hemispherical images that can cover all three-dimensional directions are generated. With the imagers Cam0, Cam1, Cam2, and Cam3 illustrated in part (a) of FIG. 5, the imaging ranges $20_0$ and $20_2$ by the set of the imagers Cam0 and Cam2, and the imaging ranges $20_1$ and $20_3$ by the set of the imagers Cam1 and Cam3 each can cover all three-dimensional directions. Described here is a case using the set of the imagers Cam0 and Cam2.

Since the two hemispherical images are provided in the form of equidistant cylindrical images according to the embodiment, transformation processing from the fish-eye images are required. A fish-eye image having a total angle of view of 180° or more is what is called circular fish-eye image. A circular image is formed on an imaging element and a region outside the circular image is an invalid region which is normally a black region.

Part (b) of FIG. 5 illustrates examples of fish-eye images $22_0$ and $22_2$ on imaging elements $21_0$ and $21_2$ of the imagers Cam0 and Cam2. Part (c) of FIG. 5 illustrates examples of hemispherical images $23_0$ and $23_2$ that are equidistant cylindrical images respectively corresponding to the fish-eye images $22_0$ and $22_2$ in part (b) of FIG. 5. In part (b) and part (c) of FIG. 5, the invalid regions are filled with black. The white regions are valid regions including valid pixels.

Figure 6A:
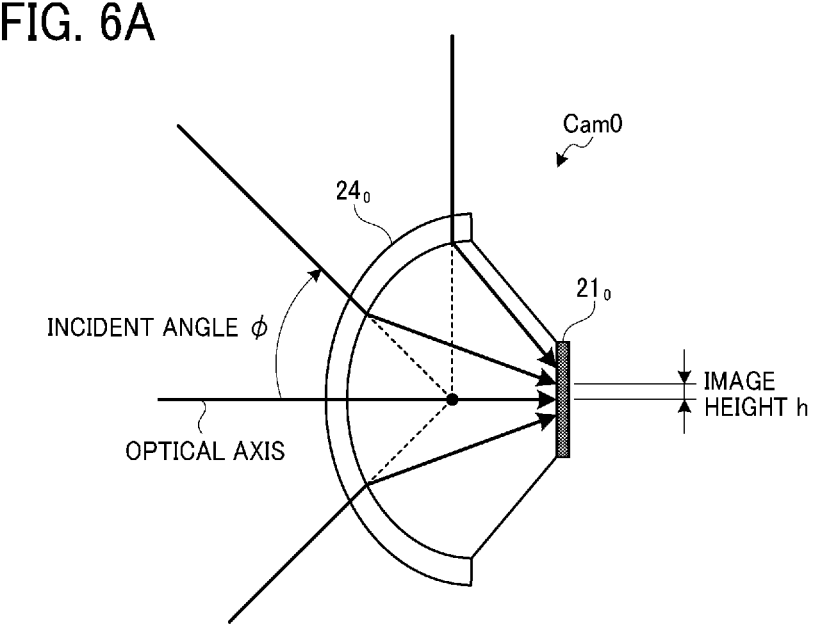
FIG. 6A is an illustration for explaining how a fish-eye lens, which is applicable to the embodiment, projects three-dimensional incident light into a two-dimensional form.
Figure 6B:
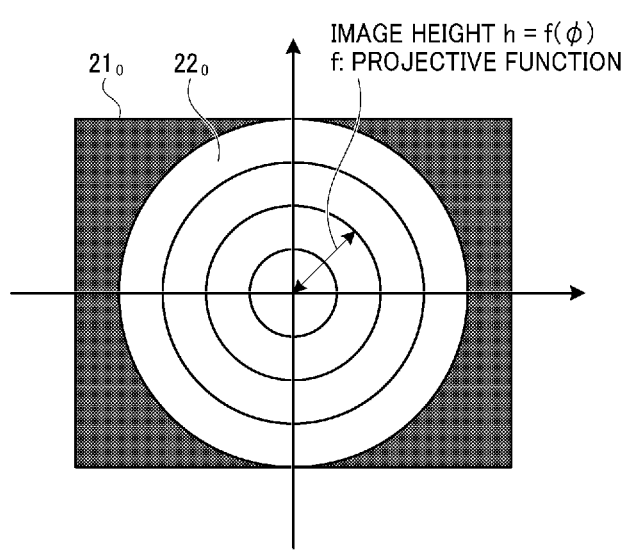
FIG. 6B is an illustration for explaining how the fish-eye lens, which is applicable to the embodiment, projects the three-dimensional incident light into the two-dimensional form.

FIGS. 6A and 6B are illustrations for explaining how a fish-eye lens, which is applicable to the embodiment, projects three-dimensional incident light into a two-dimensional form. FIG. 6A illustrates the imager Cam0 as an example. The imager Cam0 includes a fish-eye lens $24_0$ and an imaging element $21_0$. An axis perpendicular to a light receiving surface of the imaging element $21_0$ is assumed as an optical axis. In addition, in the example in FIG. 6A, an incident angle f is indicated as an angle of light with respect to the optical axis when the intersection point between the optical axis and a plane adjacent to an edge of the fish-eye lens $24_0$ is assumed as a vertex.

A fish-eye image captured by the fish-eye lens $24_0$ having an angle of view of more than 180° is an image of a scene in a range of a hemisphere from an imaging position. In this case, as illustrated in FIGS. 6A and 6B, the fish-eye image $22_0$ is generated with an image height h corresponding to an incident angle f the relation of which is de-termined by a projective function f(f). The projective function f(f) varies depending on the property of the fish-eye lens $24_0$. For example, there is a fish-eye lens $24_0$ having a projection system that is called an equidistant projection system expressed by the following Expression (1), where h denotes an image height, fL denotes a focal length, and f denotes an angle (incident angle) between the incident direction and the optical axis. In this case the fish-eye lens $24_0$ is used.

$$h = fLf \quad (1)$$

Figure 7A:
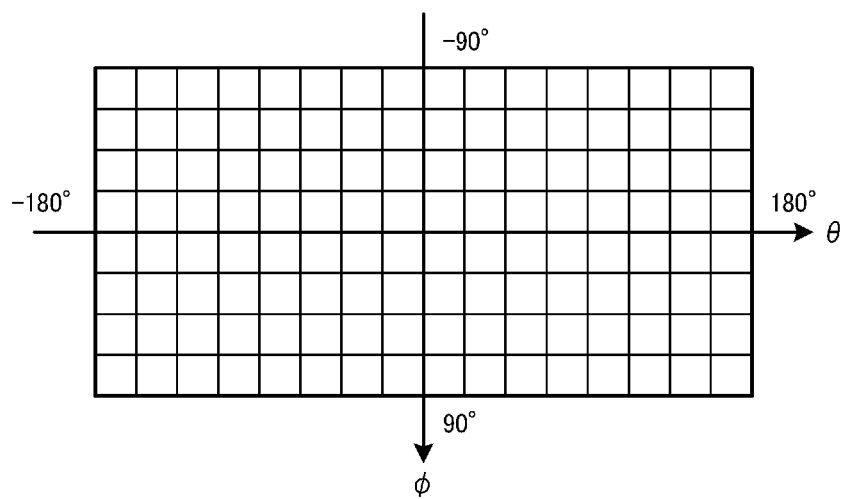
FIG. 7A illustrates the correspondence between a spherical surface and an equidistant cylindrical image applicable to the embodiment.
Figure 7B:
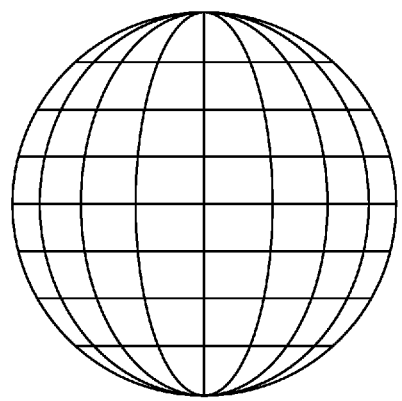
FIG. 7B illustrates the correspondence between the spherical surface and the equidistant cylindrical image applicable to the embodiment.

An equidistant cylindrical image is an image generated by using the equidistant cylindrical projection, and is expressed with coordinates having two axes that are two angular variables in a spherical coordinate system. FIGS. 7A and 7B illustrate the correspondence between a spherical surface and an equidistant cylindrical image applicable to the embodiment. FIG. 7A illustrates an example of coordinates of an equidistant cylindrical image. FIG. 7B illustrates an example of coordinates of a spherical surface. The equidistant cylindrical image is an image having pixel values corresponding to angular coordinates in which horizontal angles are in a range of from −180° through 180° and vertical angles are in a range of from −90° through 90°. The angular coordinates are associated with respective points on the spherical surface and are like latitude-longitude coordinates of a globe.

The coordinates of a fish-eye image and the coordinates of an equidistant cylindrical image can be associated with each other using the projective function f(f) as described in FIGS. 6A and 6B. Thus, images can be transformed using the correspondence.

Figure 8:
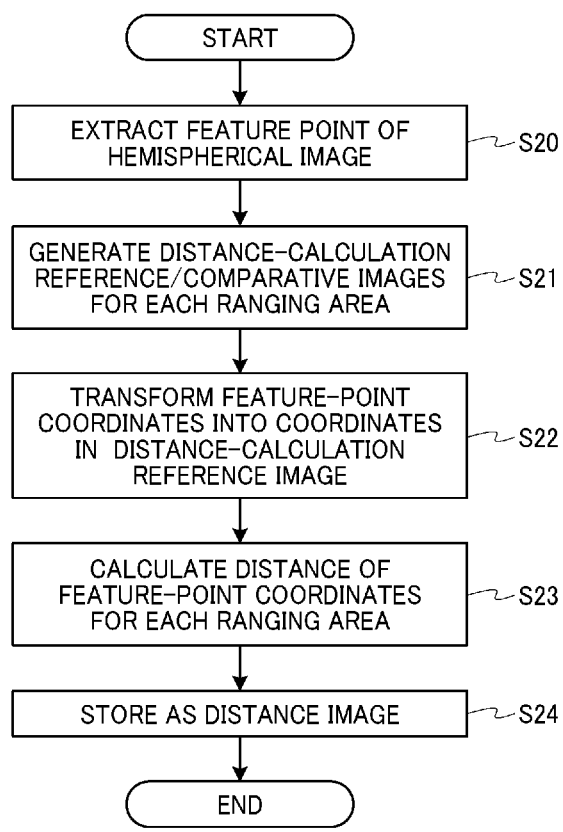
FIG. 8 is a flowchart of an example illustrating generation processing of a distance image applicable to the embodiment.

The generation processing of a distance image in step S12 in the flowchart of FIG. 4 will be described next in more detail. FIG. 8 is a flowchart of an example illustrating the generation processing of a distance image applicable to the embodiment. In this case, a distance image (referred to as hemispherical distance image) corresponding to the hemispherical image $23_0$ obtained by transforming the fish-eye image $22_0$ captured by the imager Cam0 into the equidistant cylindrical image is generated. Like processing is also applied to the hemispherical image corresponding to each fish-eye image captured by the imager Cam2. The two hemispherical distance images from the imagers Cam0 and Cam2 can cover the spherical range. Images captured by the imagers Cam1 and Cam3 are used as comparative images for distance image generation (described later).

In step S20, the hemispherical image processor 102 extracts a feature point from the hemispherical image $23_0$. A technology that is applied to the extraction of a feature point is not particularly limited as long as the technology extracts a point with a feature, such as an edge or a corner. For example, the technology may be detection using an edge detection filter or using the corner detection algorithm of Harris.

In the next step S21, the hemispherical image processor 102 generates a reference image and a comparative image for calculating a distance for each ranging area. Stereo ranging uses two images in which the same scene is captured from different points. Thus, for the imager Cam0, the ranging area is divided into a region in which stereo ranging is performed together with the imager Cam1, and a region in which stereo ranging is performed together with the imager Cam3.

Figure 9:
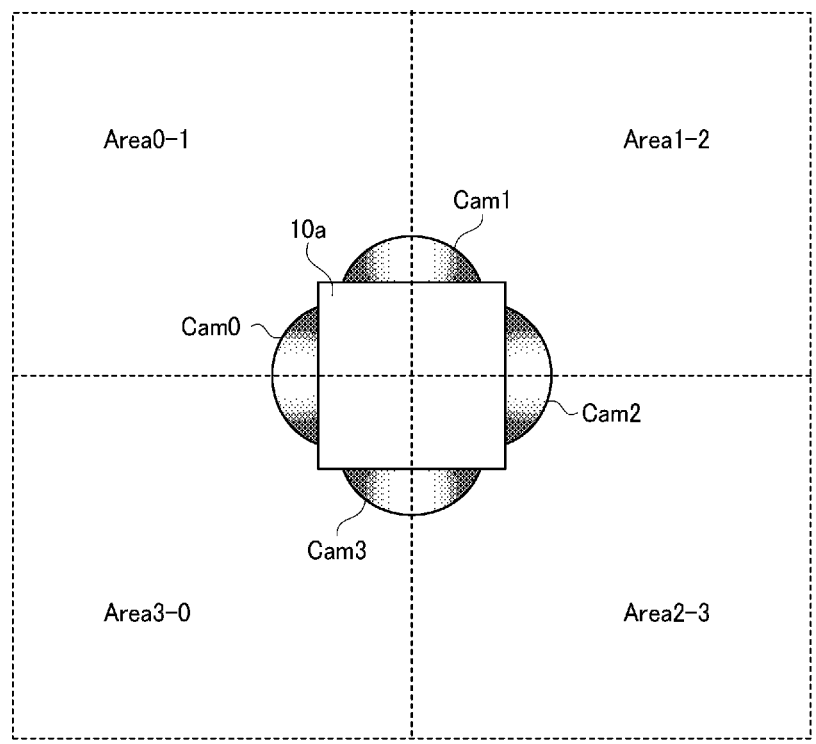
FIG. 9 is an illustration for explaining a ranging area according to the embodiment.

FIG. 9 is an illustration for explaining a ranging area according to the embodiment. In the imaging device 1a having the four imagers Cam0, Cam1, Cam2, and Cam3, all directions for a horizontal plane of the casing 10a are divided into four ranging areas Area0-1, Area1-2, Area2-3, and Area3-0.

In this case, the ranging areas Area0-1, Area1-2, Area2-3, and Area3-0 each are captured by a set of two different imagers. For example, the ranging area Area0-1 is captured by the imagers Cam0 and Cam1, the ranging area Area1-2 is captured by the imagers Cam1 and Cam2, the ranging area Area2-3 is captured by the imagers Cam2 and Cam3, and the ranging area Area3-0 is captured by the imagers Cam3 and Cam0. Thus, the combination of images for stereo ranging changes in the ranging areas Area0-1, Area1-2, Area2-3, and Area3-0.

Figure 10:
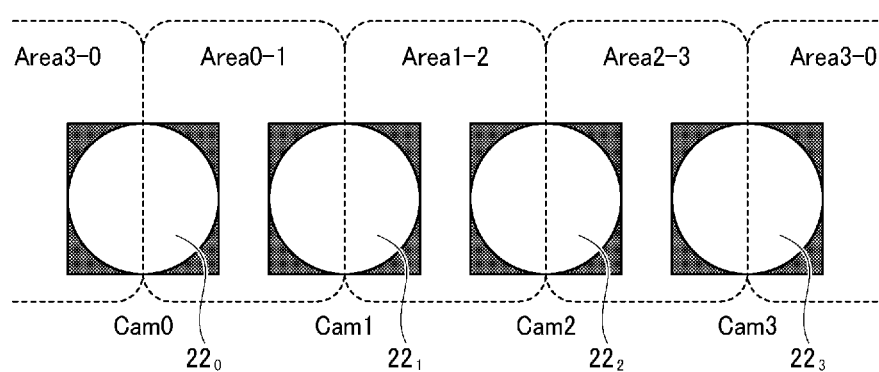
FIG. 10 illustrates the relation between fish-eye images captured by imagers and ranging areas according to the embodiment.

FIG. 10 illustrates the relation between the fish-eye images $22_0$, $22_1$, $22_2$, and $22_3$ captured by the imagers Cam0, Cam1, Cam2, and Cam3 and the ranging areas Area0-1, Area1-2, Area2-3, and Area3-0 according to the embodiment. As illustrated in FIG. 10, the fish-eye images $22_0$, $22_1$, $22_2$, and $22_3$ each span two ranging areas. For example, the fish-eye image $22_0$ spans the ranging area Area3-0 and the ranging area Area0-1. Hence, the ranging areas Area0-1, Area1-2, Area2-3, and Area3-0 each use halves of corresponding two of the fish-eye images $22_0$, $22_1$, $22_2$, and $22_3$.

A reference image and a comparative image are described. One of two images for stereo ranging is referred to as reference image and the other one is referred to as comparative image. The distance is measured in correspondence with the pixel position of the reference image. In a typical method, the reference image and the comparative image are previously parallelized for easier distance calculation. In this case, parallelized reference image and comparative image are generated. When stereo ranging is performed by using an equidistant cylindrical image, it is required to transform an image such that a direction of an axis that connects poles of f=−90° and f=90° in FIG. 7A becomes parallel to a vector from the imaging position of the reference image to the imaging position of the comparative image. Accordingly, a point in the comparative image corresponding to a feature point in the reference image can be found by search in the f-axis direction.

In this embodiment, hemispherical images are generated on the basis of the fish-eye images $22_0$ and $22_2$ captured by two imagers having optical axes substantially parallel to each other and having opposite imaging directions, for example, the imagers Cam0 and Cam2. In this case, it is required to generate a distance image corresponding to each one of the hemispherical images based on the fish-eye images $22_0$ and $22_2$. Thus, for the reference image, a hemispherical image based on the fish-eye image captured by one of the imagers Cam0 and Cam2 is selected. Table 1 illustrates an example of selection of a reference image and a comparative image for each one of the ranging areas Area0-1, Area1-2, Area2-3, and Area3-0.

TABLE 1

| Ranging area | Reference image | Comparative image |
| --- | --- | --- |
| Area0-1 | Cam0 image | Cam1 image |
| Area1-2 | Cam2 image | Cam1 image |
| Area2-3 | Cam2 image | Cam3 image |
| Area3-0 | Cam0 image | Cam3 image |

Figure 11A:
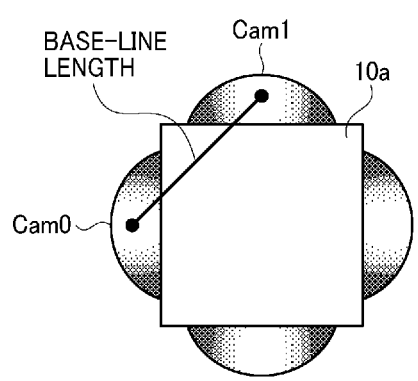
FIG. 11A is an illustration for explaining a ranging area and a ranging image according to the embodiment.
Figure 11B:
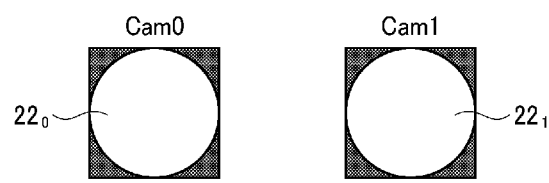
FIG. 11B is an illustration for explaining the ranging area and the ranging image according to the embodiment.

FIGS. 11A to 11C are illustrations for explaining a ranging area and a ranging image according to the embodiment. In this case, a ranging image is described with reference to FIG. 11A using the ranging area Area0-1 as an example. The fish-eye images $22_0$ and $22_1$ captured by the imagers Cam0 and Cam1 illustrated in FIG. 11B serve as a pair of fish-eye images for stereo ranging. Hence the base-line length is a length of a line connecting viewpoints of lenses of the imagers Cam0 and Cam1.

Ranging images $25_0$ and $25_1$ illustrated in FIG. 11C are image examples parallelized such that the base-line-length direction is a direction of a straight line connecting both ends of f in the equidistant cylindrical image (see FIG. 7A). In this case, the ranging image $25_0$ is used as a reference image and the ranging image $25_1$ is used as a comparative image. In FIG. 11C, white portions in the ranging images $25_0$ and $25_1$ indicate valid regions in the angle of view, and black portions indicate invalid regions outside the angle of view. The equidistant cylindrical image expresses all three-dimensional directions. Hence, a fish-eye lens having an angle of view of more than 180° does not cover the entirety, and an invalid region is present. Regions $26_0$ and $26_1$ that are valid regions in both the reference image and the comparative image indicate regions available for ranging in the ranging area Area0-1.

In the next step S22, the hemispherical image processor 102 transforms the feature point calculated in step S20 into a point in the reference image generated in step S21. At this time, the reference image is switched in accordance with the ranging area to which the feature point belongs (see Table 1). The coordinate value of the feature point transformed in the reference image is rounded to an integer value. This is because a distance is required for a value of each pixel to form a distance image after distance calculation of each feature point in the end.

Figure 12:
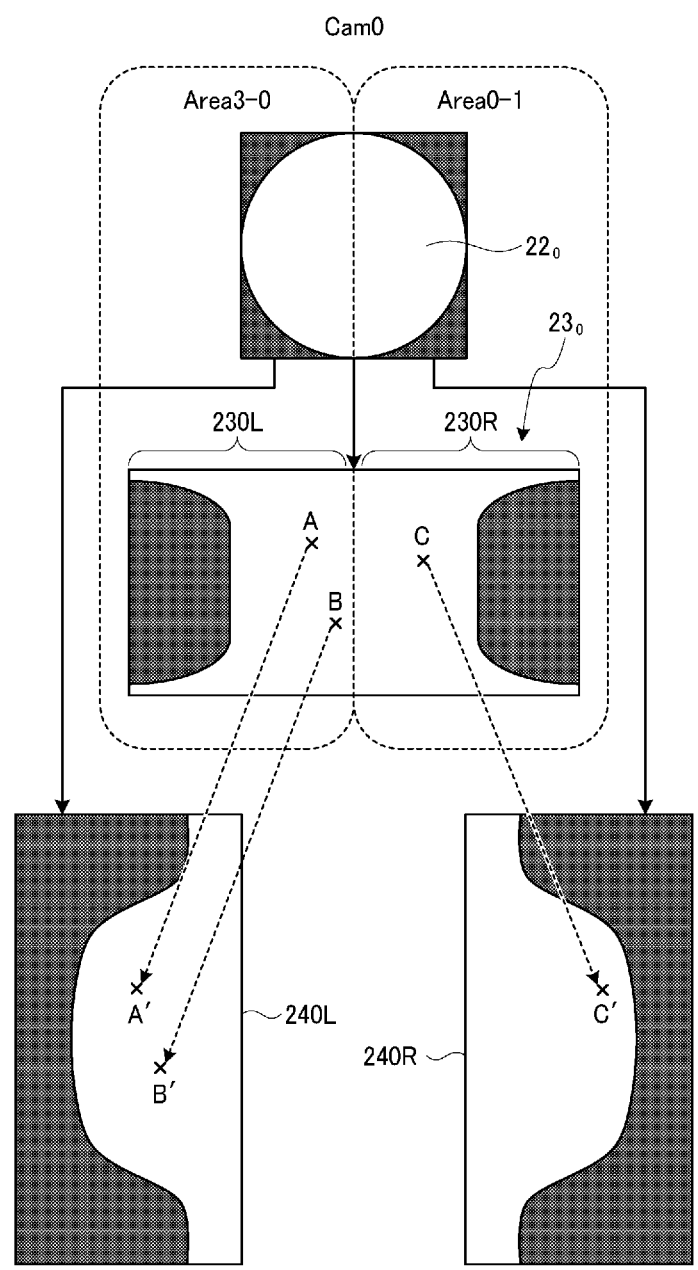
FIG. 12 is an illustration for explaining coordinate transformation of a feature point according to the embodiment.

FIG. 12 is an illustration for explaining coordinate transformation of a feature point according to the embodiment. The fish-eye image $22_0$ captured by the imager Cam0 is described here for an example. The feature point detected from the hemispherical image $23_0$ obtained by being transformed from the fish-eye image $22_0$ is transformed into a feature point in the reference image of the ranging area to which the point belongs.

More specifically, in a case (for example, points A and B) of a left half section (a region 230L in the hemispherical image $23_0$), the points A and B belong to the ranging area Area3-0, and the points A and B are transformed into points in a ranging reference image 240L of the ranging area Area3-0 (in this example, points A' and B'). In a case (for example, a point C) of a right half section (a region 230R in the hemispherical image $23_0$), the point C belongs to the ranging area Area0-1, and the point C is transformed into a point in a ranging reference image 240R of the ranging area Area0-1 (in this example, a point C').

In the next step S23, the hemispherical image processor 102 calculates the distance of the feature point coordinates for each one of the ranging areas Area0-1, Area1-2, Area2-3, and Area3-0. The method of stereo ranging is not particularly limited; however, since the angle of view is 180° or more, it is desirable to perform stereo ranging using an equidistant cylindrical image.

When the distance of a feature point is calculated, a typical method is in many cases previously parallelizing two images to easily calculate the distance. When stereo ranging is performed using an equidistant cylindrical image, it is required to transform an image such that the direction of the axis that connects the poles of f=−90° and f=90° in FIG. 7A becomes parallel to the vector from the imaging position of the reference image to the imaging position of the comparative image. Accordingly, a point in the comparative image corresponding to a feature point in the reference image can be found merely by search in the f-axis direction. An effective search method may be, for example, template matching. A method of calculating a distance from a shift amount in the f direction, that is, a parallax will be described later.

In step S24, the hemispherical image processor 102 saves the distance of the feature point coordinates calculated in step S23 as a distance image relating to the hemispherical image (hemispherical distance image). The hemispherical image processor 102 prepares a distance image buffer with the same vertical and horizontal sizes as the vertical and horizontal sizes of the hemispherical image, for example, in a predetermined region of the RAM 1002 or in the image processing circuit 1004; and stores as a value the distance of a pixel that serves as a feature point in the distance image buffer. For a pixel that does not serve as a feature point, the distance "0" or the maximum distance that can be set as data is input and hence can be distinguished.

Figure 13:
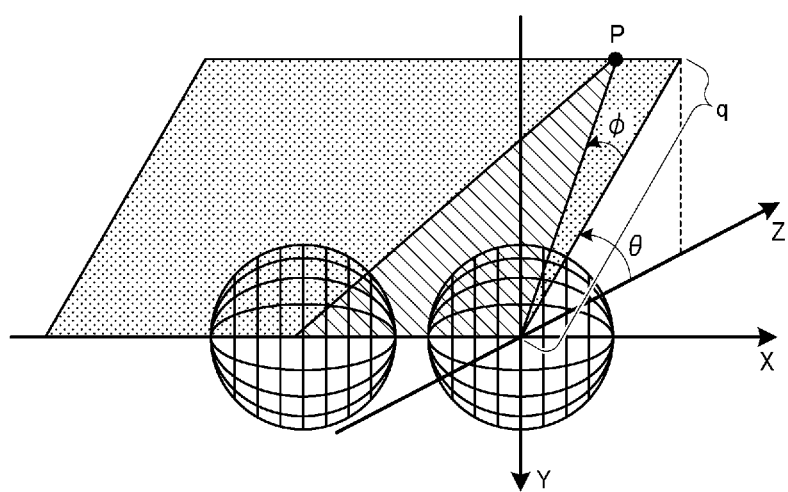
FIG. 13 is an illustration for explaining a ranging expression that can be used for calculating the distance of a feature point, the expression which is applicable to the embodiment.

FIG. 13 is an illustration for explaining a ranging expression that can be used for calculating the distance of a feature point, the expression which is applicable to the embodiment. A ranging expression that can be used for calculating the distance of a feature point P in step S23 is described with reference to FIG. 13. When the shift amount in the f direction, that is, a parallax is assumed as d [pix], a distance r [mm] in the equidistant cylindrical image is obtained by Expressions (2) to (5). The unit [pix] represents a pixel unit.

Variables, values, and coefficients that are used in Expressions (2) to (4) and FIG. 13 denote as follows.

(u, v) [pix]: Coordinate values of reference image
(xc, yc) [pix]: Image center of reference image
(f, q) [rad]: Value obtained by changing coordinate value of reference image into angle
fs [pix/rad]: Proportional coefficient for transforming angle into pixel
B [mm]: Bas-line length (distance between imaging positions of reference image and comparative image)
d [pix]: Parallax
r [mm]: Distance (radius of spherical coordinate system)

$$f=(u-xc)/fs \quad (2)$$

$$q=(v-yc)/fs \quad (3)$$

$$q=B/\{\tan(f+d/fs)-\tan(f)\} \quad (4)$$

$$r=q/\cos(f) \quad (5)$$

First Modification of Embodiment

Figure 14:
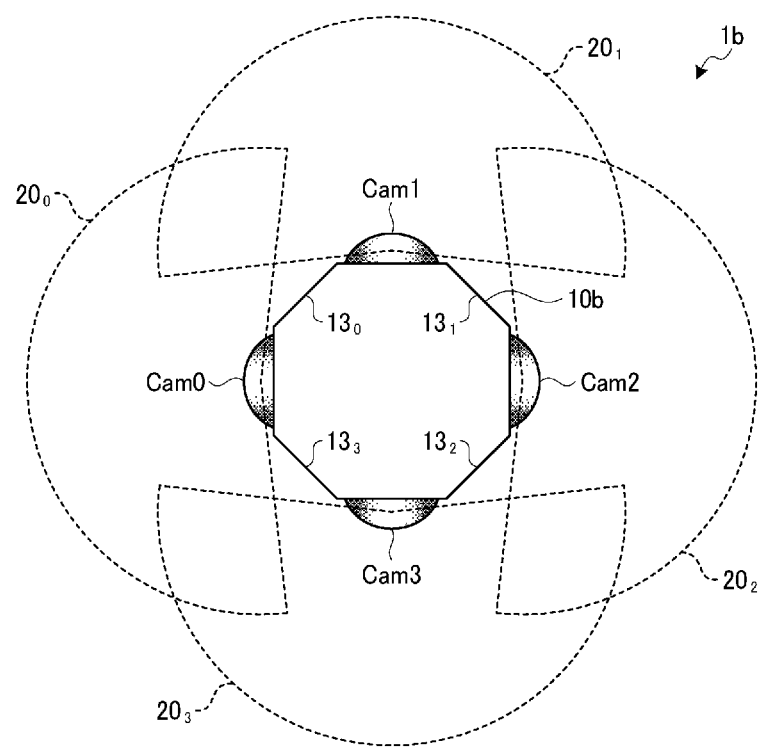
FIG. 14 illustrates an example when an imaging device according to a first modification of the embodiment is viewed from an upper surface side of a casing.

A first modification of the embodiment is described next. FIG. 14 illustrates an example when an imaging device 1b according to a first modification of the embodiment is viewed from an upper surface side of a casing 10b. In FIG. 14, the same reference sign is applied to a portion common to that in FIG. 1B, and the specific description is omitted.

In the imaging device 1a according to the above-described embodiment, the imagers Cam0 to Cam3 are arranged on the four side surfaces of the cubic casing 10a. In contrast, for the casing 10b of the imaging device 1b according to the first modification of the embodiment, referring to FIG. 14 illustrating surfaces $13_0$, $13_1$, $13_2$, and $13_3$, edges at boundaries of the side surfaces of the cubic casing 10a in FIGS. 1A and 1B are chamfered. Thus, even when the size of the casing 10b is increased relative to the sizes of lenses of the imagers Cam0 to Cam3, the casing 10b is not image captured in the angles of view of the lenses. By increasing the casing 10b in size, the imagers Cam0 to Cam3 can be arranged at increased distances between the lenses. Thus, stereo ranging with high accuracy can be performed.

A solid obtained by chamfering the cube can be considered as a cube by assuming surfaces without being chamfered as imaginary surfaces that define the solid.

Second Modification of Embodiment

Figure 15A:
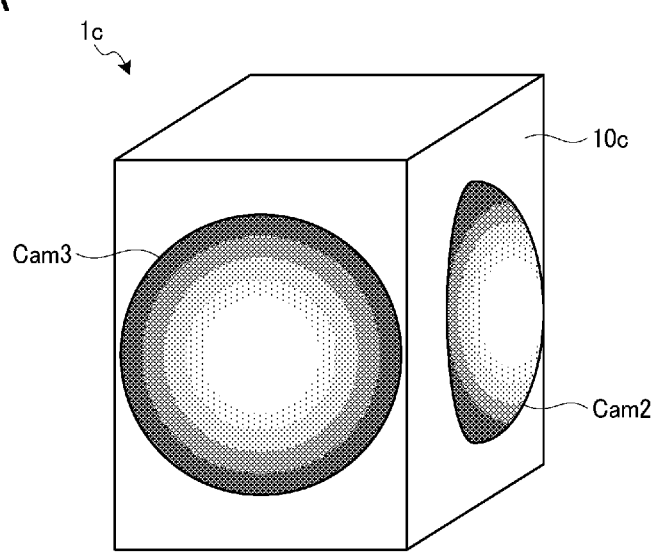
FIG. 15A is an illustration for explaining an overview of an imaging device according to a second modification of the embodiment.
Figure 15B:
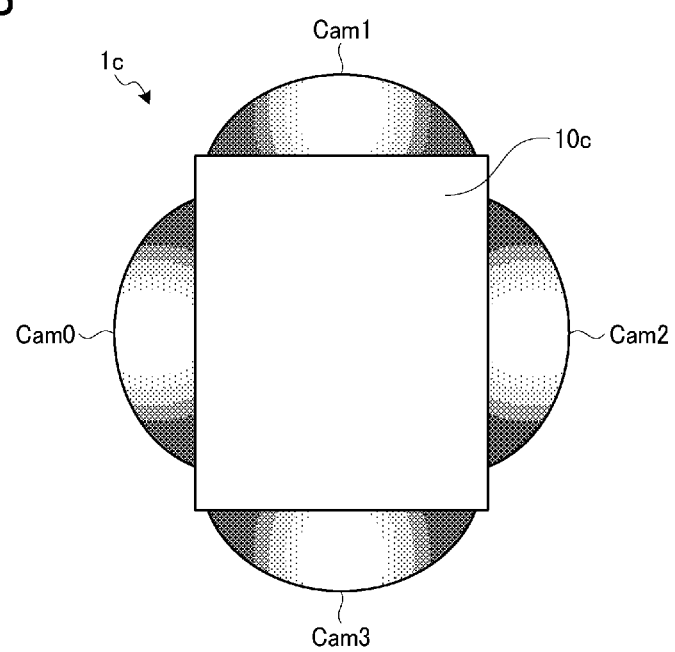
FIG. 15B is an illustration for explaining the overview of the imaging device according to the second modification of the embodiment.

A second modification of the embodiment is described next. FIGS. 15A and 15B are illustrations for explaining an overview of an imaging device according to a second modification of the embodiment. FIG. 15A is a perspective view briefly illustrating an example appearance of an imaging device 1c according to the second modification of the embodiment. FIG. 15B illustrates the imaging device 1c according to the second modification of the embodiment when viewed from an upper surface side of a casing 10c.

In FIGS. 15A and 15B, the same reference sign is applied to a portion common to that in FIGS. 1A and 1B, and the specific description is omitted. The imagers Cam0 and Cam1 are arranged on the rear surface side of the casing 10c in FIG. 15A, and hence FIG. 15A illustrates just the reference signs.

In the imaging device 1a according to the above-described embodiment, the casing 10a is formed in a cubic shape and the imagers Cam0 to Cam3 are arranged on the four side surfaces of the cubic casing 10a. In contrast, in the second modification of the embodiment, the casing 10c is configured as a rectangular parallelepiped with a rectangular upper surface in which two opposite sides have lengths equal to each other and two sides adjacent to each other at a vertex have lengths different from each other instead of a square having four equal sides. As long as the ratio between the short side and the long side of the rectangle is a predetermined value or less, that is, as long as the rectangle has a shape that each one of the imagers Cam0 to Cam3 does not image capture another imager (fish-eye lens) at a surface whose at least one side is adjacent to the surface provided with the one imager, the rectangular-parallelepiped casing 10c can execute stereo ranging according to the above-described embodiment.

Without being limited to this, the casing at which the respective imagers are arranged may have any shape as long as the shape is a solid defined by six quadrangular surfaces, having two opposite surfaces parallel to each other, and provided with imagers at at least four surfaces from among the six surfaces. For example, the casing may have a shape called parallelepiped defined by six parallelogram surfaces.

Third Modification of Embodiment

Figure 16A:
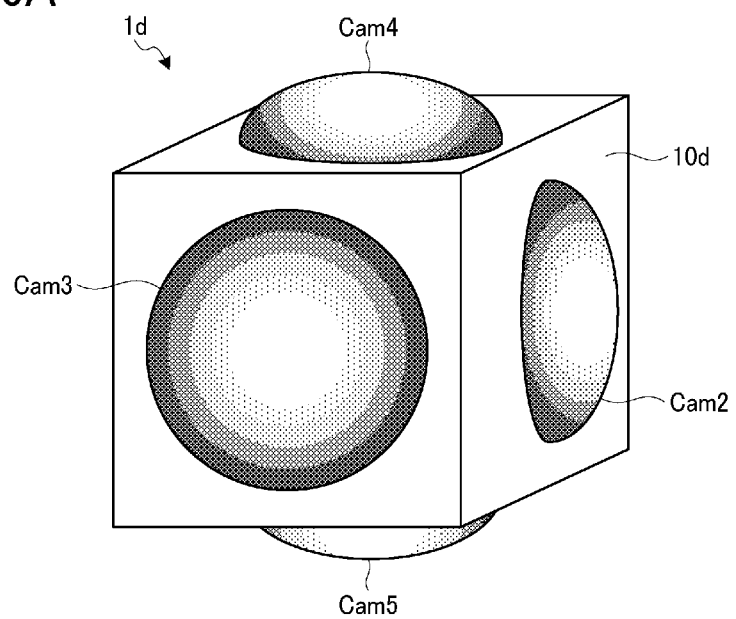
FIG. 16A is an illustration for explaining an overview of an imaging device according to a third modification of the embodiment.
Figure 16B:
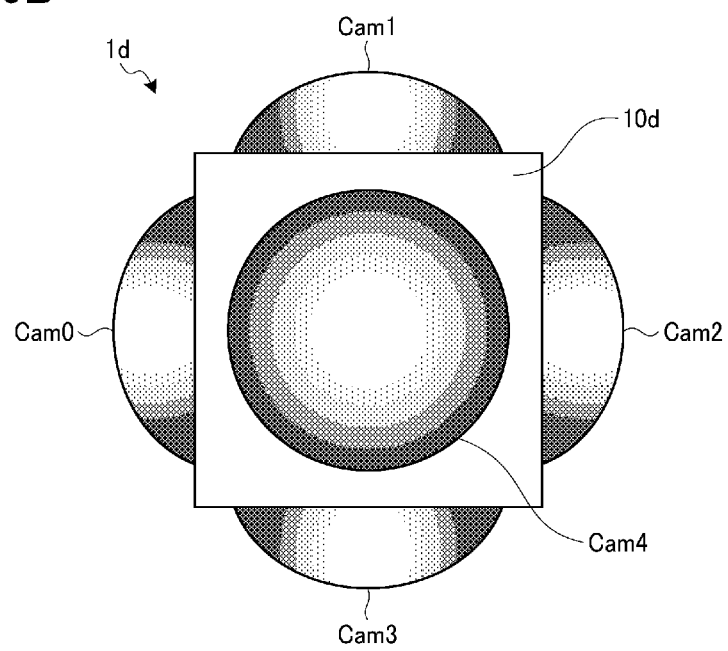
FIG. 16B is an illustration for explaining the overview of the imaging device according to the third modification of the embodiment.

A third modification of the embodiment is described next. FIGS. 16A and 16B are illustration for explaining an overview of an imaging device according to a third modification of the embodiment. FIG. 16A is a perspective view briefly illustrating an example appearance of an imaging device 1d according to the third modification of the embodiment. FIG. 16B illustrates the imaging device 1d according to the third modification of the embodiment when viewed from an upper surface side of a casing 10d.

In the imaging device 1a according to the above-described embodiment, the imagers Cam0 to Cam3 are arranged on the four side surfaces of the cubic casing 10a. In contrast, in the imaging device 1d according to the third modification of the embodiment, as illustrated in FIGS. 16A and 16B, in addition to four side surfaces of the cubic casing 10d, imagers Cam4 and Cam5 are further arranged at an upper surface and a bottom surface of the casing 10d. Thus, images can be captured with three imagers in all three-dimensional directions. There is known a stereo ranging technology that further increases accuracy by capturing images from different positions using three or more lenses. By applying the technology to the imaging device 1d according to the third modification of the embodiment, spherical distance measurement with high accuracy can be performed.

Fourth Modification of Embodiment

Figure 17:
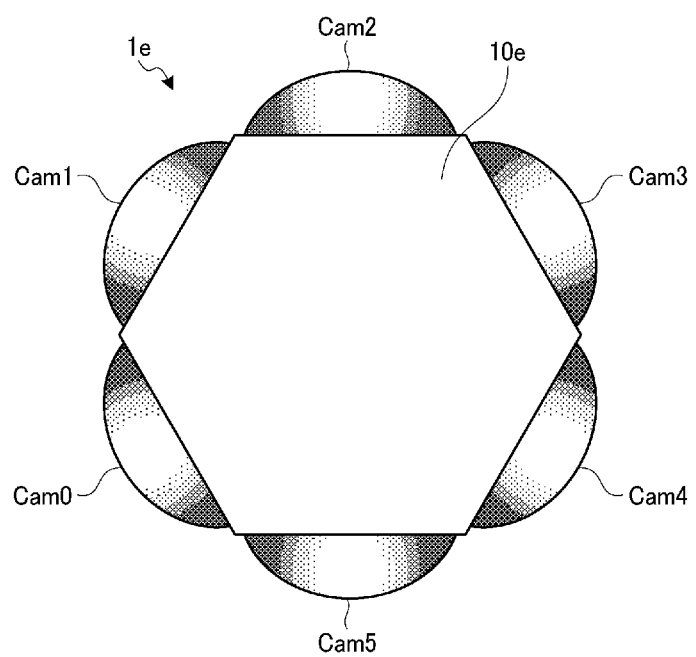
FIG. 17 illustrates an example when an imaging device according to a fourth modification of the embodiment is viewed from an upper surface side of a casing.

A fourth modification of the embodiment is described next. FIG. 17 illustrates an example when an imaging device 1e according to a fourth modification of the embodiment is viewed from an upper surface side of a casing 10e. As illustrated in FIG. 17, in the fourth modification of the embodiment, the casing 10e is configured by a hexagonal column, imagers Cam0, Cam1, Cam2, Cam3, Cam4, and Cam5 are arranged on six surfaces of the hexagonal column of the casing 10e, and thus the fourth modification uses the six imagers.

Also in this case, for each one of the imagers Cam0 to Cam5, another imager having an optical axis substantially parallel to the optical axis of the one imager and having an imaging direction opposite to the imaging direction of the one imager is arranged (for example, the imager Cam3 is provided for the imager Cam0). Hence, two imagers can capture images in all three-dimensional directions. Thus, images can be captured with three imagers in all three-dimensional directions.

In addition, since a lower surface is not provided with a lens as compared with the third modification of the embodiment, a space for arranging a grip or an imaging button can be easily provided.

Fifth Modification of Embodiment

Figure 18:
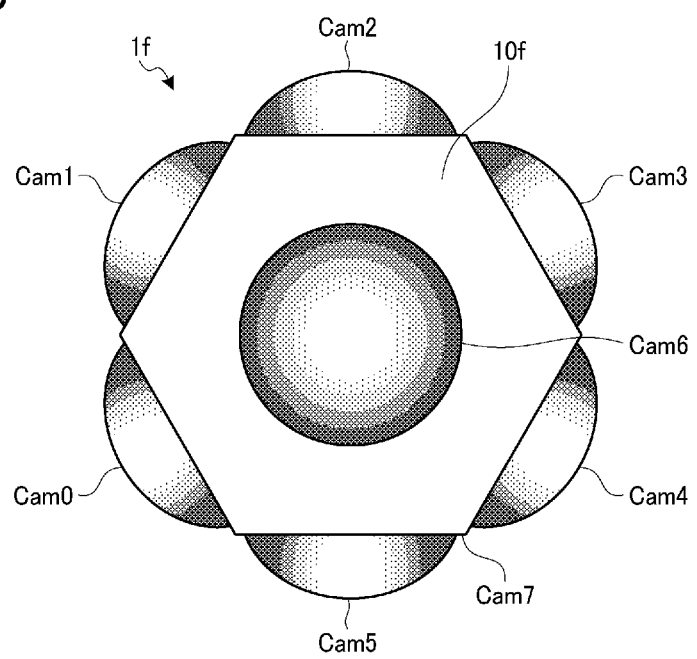
FIG. 18 illustrates an example when an imaging device according to a fifth modification of the embodiment is viewed from an upper surface side of a casing.

A fifth modification of the embodiment is described next. FIG. 18 illustrates an example when an imaging device if according to a fifth modification of the embodiment is viewed from an upper surface side of a casing 10f. As illustrated in FIG. 18, the fifth modification of the embodiment is an example in which imagers Cam6 and Cam7 are added to an upper surface and a lower surface of the hexagonal column of the casing 10e configured by the hexagonal column described in the fourth modification of the embodiment, and hence the fifth modification uses eight imagers Cam0 to Cam7. The imager Cam7 is arranged on the rear surface side (bottom surface) of the casing 10f in FIG. 18, and hence FIG. 18 illustrates merely the reference sign.

Also in this case, for each one of the imagers Cam0 to Cam7, another imager having an optical axis substantially parallel to the optical axis of the one imager and having an imaging direction opposite to the imaging direction of the one imager is arranged. Hence, two imagers can capture images in all three-dimensional directions. With the configuration having the eight imagers, images can be captured with four imagers (for example, the imagers Cam0, Cam1, Cam2, and Cam6) in all three-dimensional directions from different positions.

Furthermore, the number of imagers arranged at a single casing can be increased by an even number, such as 10, 12, . . . , so long as the structure of the imaging device can accommodate the imagers. For example, an imager having a fish-eye lens with a total angle of view of 180° or more can be arranged on each surface of a regular icosahedron.

Sixth Modification of Embodiment

While the first embodiment describes that the imagers Cam0 to Cam3 each can capture an image with the total angle of view of 180° or more, the angle of view of each imager is not limited to this example. For example, two of the four imagers Cam0 to Cam3 may each have a total angle of view of 200°, and the other two imagers may each have a total angle of view of 160°. With the combinations, by arranging imagers with the same angle of view on opposite surfaces, imaging ranges of imagers arranged on two surfaces sharing an edge can overlap each other, and omnidirectional distance measurement can be performed similarly to the first embodiment.

Further, in this disclosure, the spherical image does not have to be the full-view spherical image of a full 360 degrees in the horizontal direction. For example, the spherical image may be a wide-angle view image having an angle of anywhere from 180 to any amount less than 360 degrees in the horizontal direction.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

This patent application is based on and claims priority pursuant to 35 U.S.C. § 119(a) to Japanese Patent Application No. 2018-050207, filed on Mar. 16, 2018, in the Japan Patent Office, the entire disclosure of which is hereby incorporated by reference herein.

REFERENCE SIGNS LIST 1a, 1b, 1c, 1d, 1e, 1f Imaging device
10a, 10b, 10c, 10d, 10e, 10f Casing
$20_0$, $20_1$, $20_2$, $20_3$ Imaging range
$21_0$, $21_2$ Imaging element
$22_0$, $22_2$ Fish-eye image
$23_0$, $23_2$ Hemispherical image
$24_0$ Fish-eye lens
$25_0$ Ranging image
100 Image acquirer
102 Hemispherical image processor
103 Spherical image processor
240L, 240R Ranging reference image
Area0-1, Area1-2, Area2-3, Area3-0 Ranging area
Cam0, Cam1, Cam2, Cam3, Cam4, Cam5, Cam6, Cam7 Imager

The invention claimed is:

1. An imaging device, comprising:
at least six imagers, each including an imaging element configured to receive light incident through a lens having an angle of view of 180° or more; and
a casing on which at least six of the at least six imagers are arranged, the casing being a hexagonal column having eight surfaces and being configured such that each one of the imagers and another one of the imagers have optical axes substantially parallel to each other and have opposite incident directions of light on the optical axes, and each one of the imagers is arranged outside imageable ranges of the other imagers,
wherein the at least six imagers are configured to capture images in all three-dimensional direction, and the images in each direction are captured with three imagers among the at least six imagers.

2. The imaging device according to claim 1, wherein eight of the imagers are arranged on the casing.

3. The imaging device according to claim 1, wherein the imagers are arranged on only six surfaces from among the eight surfaces.

4. An image processing apparatus, comprising:
an acquirer configured to acquire captured images captured by at least four imagers, each including an imaging element configured to receive light incident through a lens having an angle of view of 180° or more, the imagers being arranged on a casing such that each one of the imagers and another one of the imagers have optical axes substantially parallel to each other and have opposite incident directions of light on the optical axes, and each one of the imagers is arranged outside imageable ranges of the other imagers; and
an image processor configured to generate a spherical distance image expressed by three-dimensional point-group information, based on the captured images acquired from all the imagers arranged on the casing, by extracting feature points in a first captured image of the captured images, and transforming the extracted feature points into a reference image obtained from a second captured image of the captured images,
wherein the first captured image and the second captured image are captured by two of the imagers arranged at two surfaces sharing an edge of the casing, respectively.

5. The image processing apparatus according to claim 4, wherein the image processor further generates a spherical image in which each pixel is expressed by at least brightness information based on the captured images acquired from all the imagers arranged at the casing.

6. The image processing apparatus according to claim 5, wherein the image processor combines a set of the captured images acquired from the two of the imagers arranged at two surfaces sharing an edge of the casing, and a set of the captured images acquired from two of the imagers arranged at the casing and having optical axes substantially parallel to each other and having opposite incident directions of light on the optical axes, and generates the spherical distance image and the spherical image in all three-dimensional directions.

7. The image processing apparatus according to claim 4, wherein the acquirer acquires the captured image from each one of the imagers each including the imaging element configured to receive light incident through the lens having an angle of view of 180° or more.

8. The image processing apparatus of claim 4, wherein the image processor is further configured to obtain the reference image by transforming the second captured image into an equidistant cylindrical image.

9. An image processing method, comprising:
acquiring captured images captured by at least four imagers, each including a lens with a total angle of view of 180° or more and an imaging element configured to receive light incident through the lens, the imagers being arranged on a casing such that each one of the imagers and another one of the imagers have optical axes substantially parallel to each other and have opposite incident directions of light on the optical axes, and each one of the imagers is arranged outside imageable ranges of the other imagers; and
generating a spherical distance image expressed by three-dimensional point-group information, based on the captured images acquired from all the imagers arranged on the casing, by extracting feature points in a first captured image of the captured images, and transforming the extracted feature points into a reference image obtained from a second captured image of the captured images, wherein the first captured image and the second captured image are captured by two of the imagers arranged at two surfaces sharing an edge of the casing, respectively.

10. An imaging system, comprising:

the image processing apparatus of claim 4; and an imaging device including the at least four imagers and the casing, wherein the casing is a cube having chamfered surfaces.

* * * * *